INVENTOR
Harold A. List

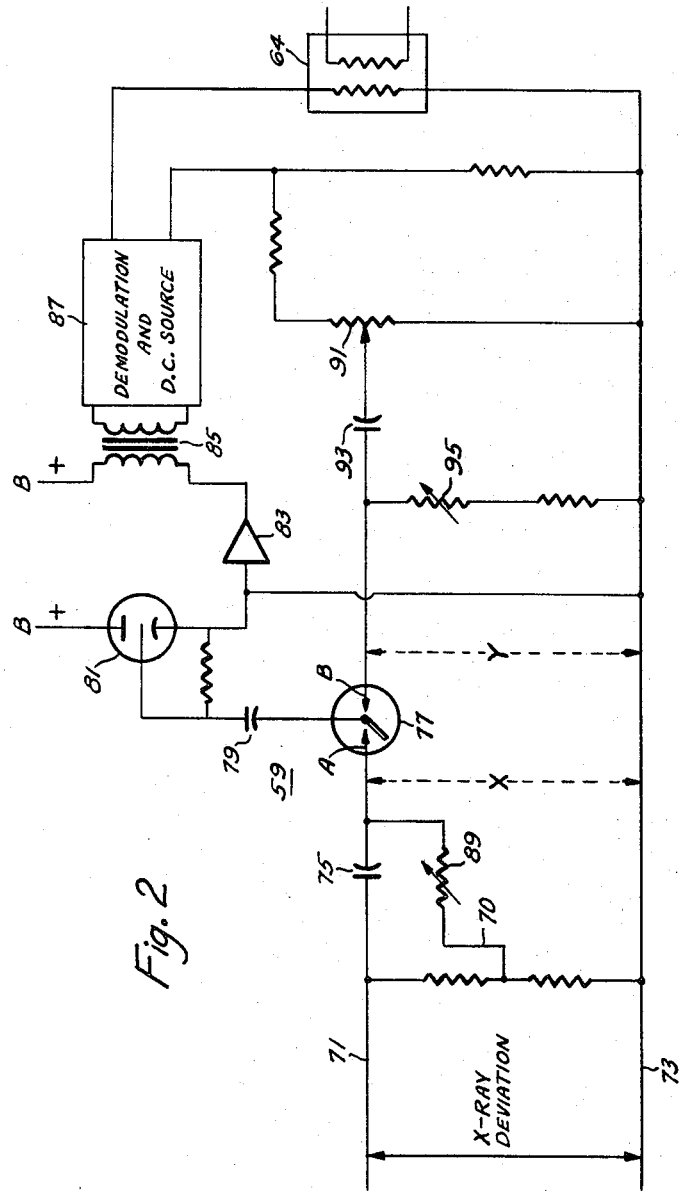

United States Patent Office 3,416,339
Patented Dec. 17, 1968

3,416,339
AUTOMATIC CONTROL SYSTEM FOR
ROLLING MILLS
Harold A. List, Bethlehem, Pa., assignor to Bethlehem
Steel Corporation, a corporation of Delaware
Filed Dec. 30, 1966, Ser. No. 606,343
11 Claims. (Cl. 72—8)

ABSTRACT OF THE DISCLOSURE

An automatic control system for a rolling mill consisting of a series of initial gagemeter controlled stands, a pivot stand controlled by signals representing (a) the calculated gage of sheet or strip material exiting from the last such gagemeter stand, said calculation being derived by algebraic summing of a screw position signal and a load cell signal from said last gagemeter stand, and (b) by a signal from a multi-functional controller associated with an X-ray gage following the last stand in the mill, to which last stand a signal from the X-ray gage is also applied as a control signal. A screw position feedback signal from the pivot stand balances the combined X-ray control signal and the feed forward signal from the last gagemeter stand. The screw position signal is also applied directly to the mill motor speed control of the last gagemeter stand to supplement speed control provided by a looper control system. Alternately the signal from a load cell on a stand subsequent to the pivot stand may be combined with the X-ray signal or used in place of the X-ray signal to combine with the feed forward signal from the last gagemeter stand to control the pivot stand. The gagemeter stands are returned to a predetermined position after each strip drops out of the mill, while the stands controlled by the X-ray are returned to an updated position representing an adjustable integration of the changes made during the rolling of the previous strip.

Background of the invention

This invention relates to automatic control systems for rolling mills wherein very fast corrections in gage of the strip can be made by automatic control.

In the past so-called "gagemeter" gage control systems such as basically disclosed in Patent 2,680,978 to Hessenberg et al. have been used in combination with X-ray or similar radiation type gage determining devices to automatically control the rolling of strip in rolling mills. In such mills the X-ray gage is expected to determine long term changes such as mill heating and strip cooling and correct overall errors in the gage of the strip rolled by the use of the gagemeter system. Other rolling mills have used only an X-ray gage for the adjustment of mill screwdowns to produce strip of the desired gage. The use of X-ray gages alone, however, has the disadvantage that very rapid changes in the gage of the strip are not detected until the portion of the strip in which the change occurred has already been rolled unless X-ray gages are placed between one or more of the stands, an expedient which has generally proved impractical due to space limitations and the adverse environmental conditions between stands coupled with the generally delicate nature of X-ray apparatus. Gagemeter stands can make corrections in gage with less time lag. As strip material is reduced in gage, however, the load cell signals which are used to calculate the spring of the mill become more and more similar to the screw position signals required to compensate for the spring until with very thin and particularly with thin and wide material the load cell signal changes by almost exactly the same amount with a change in screwdown as the screw position signal changes. This creates an ambiguous condition of the gagemeter control as there is no really unique combination of signals defining any given position of the screwdown. Sudden surges of feedback, such as occur when large corrections of gage are attempted, may, in combination with slight errors in adjusting the relative magnitude of the roll force and the screw position signals cause the screwdowns to run away, either in the up or down direction. To minimize the tendency of a gagemeter stand to runaway when adjusted to control gage closely for a thin and wide product, the ratio of the roll force and screw position signals must be adjusted to give substantially less screw movement than is desired to compensate for mill spring and the gage control performance must therefore be compromised, preventing a gage control system based on the gagemeter principle from making corrections to gage that are both rapid and accurate.

Summary of the invention

I have discovered that the foregoing disadvantages can be overcome and that rapid and accurate corrections in strip gage can be made automatically by providing one or several of the rear stands of the mill with a powerful fast-acting screwdown mechanism controlled by a calculated gage signal fed forward from a previous stand in the mill combined with a signal from a succeeding X-ray gage, the X-ray signal being preferably modified by a multi-functional X-ray signal controller which increases or decreases the screw control signal depending on how great the deviation from the desired gage is and how long, how fast and in what direction the error is changing, and preferably by providing the earlier stands of the finishing train with gagemeter control to minimize the gage variations reaching the later stands.

Brief description of drawing

FIGURE 2 is a diagrammatic representation of the multi-functional X-ray controller such as used in the present invention.

Description of the preferred embodiment

Figure 1:
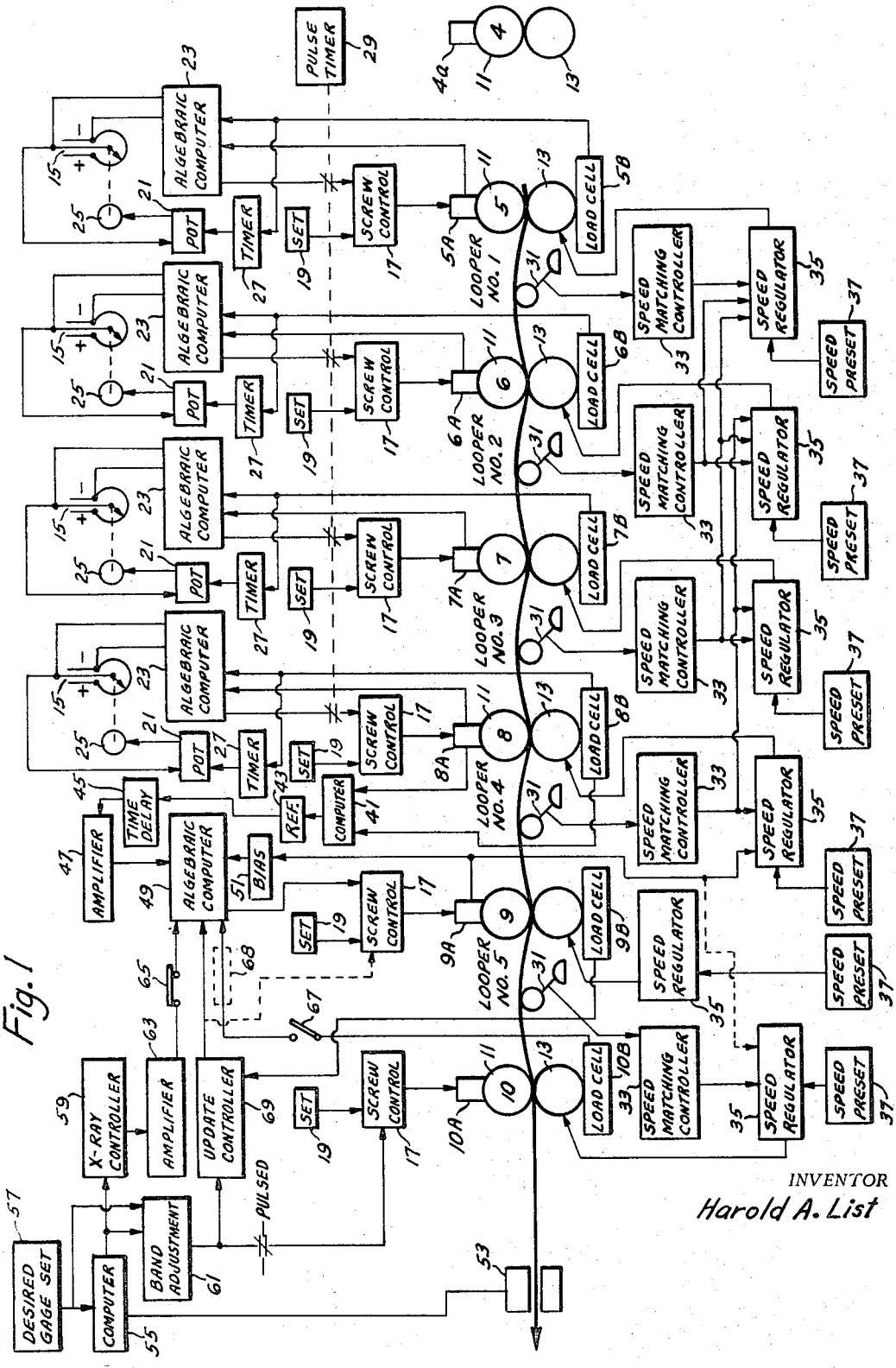
FIGURE 1 is a diagrammatic representation of a rolling mill having an automatic mill control according to the present invention.

In FIGURE 1 are shown the last six stands 5, 6, 7, 8, 9 and 10 in a hot rolling mill finishing train. The rolls of previous roughing stands such as stand 4 are conventionally set in predetermined positions and not automatically controlled by the system described here. Each of the stands has upper rolls 11 and lower rolls 13. Each stand also has a screwdown mechanism 5A, 6A, 7A, 8A, 9A or 10A, and a load cell 5B, 6B, 7B, 8B, 9B or 10B designated to detect the load or force existing between the rolls of the mill. The first four controlled stands are gagemeter stands in which the load signal from the load cells 5B, 6B, 7B and 8B is applied to an individual algebraic computer 23 for each stand and summed according to a formula with a screwdown position signal derived from the respective screwdown mechanisms 5A, 6A, 7A or 8A by any suitable mechanism such as a selsyn, not shown, and compared with a reference signal derived from a suitable reference device such as potentiometers 15 for setting the desired roll opening. A deviation signal is then directed by the algebraic computer 23 to an automatic screw control 17, of each respective mill stand which control activates the screwdown mechanism of the particular mill stand to move the rolls until the three control signals have reached a null point.

At the beginning of operation of the mill, or between strips, screw controllers 17 are activated by set point means 19 which may be set manually or by computer means to position the rolls to a predetermined position.

Preferably as a strip enters each one of the mill stands 5, 6, 7 and 8 the reference potentiometer 15 for each respective mill stand will be balanced automatically to match the computed sum of the load cell signal and the screw position signal by means of a suitable potentiometer type balancing device 21 which receives the computed signal from algebraic computer 23 and the reference signal from the reference potentiometer circuit 15 and directs a motor operating signal to reset motor 25 which moves the reference potentiometer 15 to balance the two signals to a null point a predetermined time after the strip enters the mill stand determined by timer 27 from a load cell signal from the respective stand. Thereafter for the remainder of that strip the reference potentiometer 15 remains at the same set point and the computed roll opening signal is balanced against it in the normal gagemeter manner by the operation of the respective screwdown mechanism by screw controller 17 to alter the screw position feedback signal. The control signals from the algebraic computer 23 to screw controller 17 are preferably pulsed by a timer 29 in order to stabilize the system and give time for the effect of each change to be determined so that overshooting will not occur. Preferably once the reference 15 for the first mill stand 5 is set for the first strip of an order the reference is left in the same position for the rest of that order unless changed manually. This tends to provide an initial uniformity between the strips of an order. The reference potentiometer for stands 6, 7 and 8 are repositioned at the beginning of each strip, however, so that each strip is individually leveled or made uniform. These control stands thus take advantage of the initial uniformity provided by stand 5 and further even out all inequalities in the gage of a strip from end to end. Stands 5, 6, 7 and 8 in the first section of the mill function primarily to even out large slow variations in the gage of the strip.

Associated with each mill stand except 9, which is the pivot stand, is a looper 31 which detects changes in the tension in the strip between stands and directs a control signal to a speed matching controller 33 which in turn directs a control signal to a speed regulator 35 for the mill motors of an adjoining mill stand. Thus the movement of the looper between stands 5 and 6 controls the roll speed of stand 5, the looper between stands 6 and 7 controls the roll speed of stand 6, and so forth, and the looper between stands 9 and 10 controls the roll speed of stand 10. Each speed regulator 35 for the respective mill stands may have its speed preset by an appropriate speed preset and manual adjustment 37. The roll speed of pivot stand 9 is not adjusted by any looper and therefore has only a speed regulator and speed preset. The looper control system is preferably of the advanced type shown in applications Ser. Nos. 419,310, now Patent No. 3,318,125 and 525,082 filed Dec. 18, 1964 and Feb. 4, 1966 by Charles C. Pullen. Preferably in the present looper control system there is additionally provided a cascade feedback signal from subsequent speed matching controllers to previous speed regulators 35 of a proportionally decreased signal so that a sudden change, particularly of the speed of stand 8, as will be further explained below, will be immediately partially reflected in the speed of previous stands.

Mill stand 9 is not only the pivot stand but the key stand for automatic gage control in the illustrated mill. This stand is provided with high pitch screw mechanisms and powerful motors to drive the screws. An other suitable high speed drive or change mechanism can also be used.

As previously explained, if stand 9 was a gagemeter stand and high speed changes were made in its screw position the mill might have a tendency to run away. On the other hand if the high speed screwdown mechanism is operated only by an X-ray at the end of the mill there is some lag in the initiation of control signals to correct any off gage material. In order therefore to begin substantially instantaneous corrections to the strip in mill stand 9 as soon as off gage material is detected, a roll force signal is directed by load cell 8B to a gage computer 41 which calculates the mill spring and adds this to the screwdown position signal from screwdown mechanism 8A to indicate the actual roll opening in mill stand 8, and thus the gage of strip material issuing from this mill stand. This computed gage signal is then fed to a reference computer 43 where an automatically or manually determined reference is compared with the actual gage provided by computer 41 and a gage deviation signal fed through time delay device 45, which delays the signal the period necessary for the strip to travel from stand 8 to stand 9, and then applies the signal through a variable gain amplifier 47, which may be manually preset to an appropriate gain, to algebraic computer 49 where the signal is balanced against a screw position signal from screwdown mechanism 9A to provide a screwdown control signal for the screw control 17 of stand 9. The screwdown position signal from screwdown mechanism 9A is adjustably decreased by biasing adjustment 51 in order to partially compensate for the spring of the mill since there is no load cell signal from load cell 9B to algebraic computer 49 to provide a mill yield indication. Load cell 9B functions only to provide a maximum load signal above which the mill will be released to prevent damage, and a control signal to the looper control system as described in the Pullen applications referred to above. These signals are also provided by the other load cells in the mill in addition to the signals to the gage control computers. Load cell 9B also provides a load cell signal indicating the presence or absence of strip in stand 9 to an update controller 69 as described below. The feed forward from stand 8 of the computed gage entering stand 9 enables stand 9 to immediately begin to compensate for anticipated gage errors in the strip.

Since the screwdown mechanism on stand 9 is of a fast acting type which will quickly correct large deviations in gage from that desired, such as may particularly occur at the head end of the first bar of a new order due to mill setup errors, the resulting sudden changes in the amount of trip preceding the mill may be too great for the normal looper control. The screwdown position signal from the screwdown mechanism 9A is consequently applied directly to the speed regulator for stand 8 in addition to the normal looper control signal in order to quickly compensate for such large deviations. The speed of stand 8 is thus directly controlled in part by movements of the screws on stand 9. Precise adjustments of the speed of stand 8 are made by the action of the lopper through the speed matching controller over and above the quick rough adjustment provided by the direct signal from stand 9. If desired, a direct application of the screwdown signal could also be made to the speed regulator for stand 10 as shown in FIGURE 1 by a dotted line. It will be understood that the circuit in the speed controller of stand 10 will be arranged so that this signal will cause an increase in speed of stand 10 when it causes a decrease in the speed of stand 8, and vice versa.

An X-ray gage 53 is located after stand 10 at the end of the mill. If the gage of the strip has not been brought to the exact desired gage by the time it reaches X-ray gage 53, this gage measures substantially the exact gage of the strip issuing from the mill and directs an X-ray gage signal to a computer 55 where it is compared with the desired gage from set point means 57, and a gage deviation signal sent to the screw control of stand 10 and a three-functional gage controller 59 which adjusts the signal depending upon the size of the deviation, the duration of the deviation, and the direction and speed of change of the deviation, as will be described more fully below. The signal to the screw controller of stand 10 is pulsed in order to allow changes made by the screwdown to be reflected in changes in the strip gage before additional changes are made. This signal passes through a band adjustment means 61 before being pulsed, which band adjustment allows only those control signals which are a predetermined degree greater or less than the screw gage to pass through to the screw control. Stand 10 is not equipped with a high speed screwdown and normally makes corrections only for long term trends in the mill such as roll heating and strip cooling and for errors in mill setup. Stand 9 on the other hand is designed to make quick corrections in the gage of the strip. The X-ray feedback signal from X-ray gage 53 is therefore taken through the three-functional controller 59 where it is made proportionate to the indicated deviation from the desired gage, the length of time the deviation has persisted, and the rate at which the deviation signal is increasing or decreasing. Thus if there is a large deviation signal which is increasing, the deviation signal will be increased a substantial amount, depending on the setting, more than if the large signal is decreasing, and is increased very much more if the deviation signal is increasing fairly rapidly as a result of the error in gage of the strip increasing fairly rapidly. The speed of correction of mill stand 9 is thus enabled to be increased not only by the nature of the mill stand screwdown, but by the nature of the control arrangement. The deviation signal from three-functional controller 59 is applied to algebraic computer 49 through variable gain amplifier 63 and switch 65 and is added in computer 49 to feed forward signal from stand 8 for rapid control of stand 9. The relative gain of amplifiers 47 and 63 may be adjusted in the ratio which provides the most desirable control for the particular material being rolled. The gain of amplifier 47 will be adjusted so that it corrects for quick changes in gage before they have passed stand 9. The gain of amplifier 63 will be adjusted to take as much advantage of the effect of the multi-functional controller 59 as possible. With the control system described the mill is enabled to make large and rapid corrections to gage by automatic control which on other systems must be made manually. The gain of amplifier 47 does not have to be precisely adjusted with respect to the gain of amplifier 63. Any value between zero and two hundred percent of the theoretical balanced value between the two signals will be of assistance to the controller 17 of stand 9 in using the X-ray signal. Thus it is not necessary to balance the signals proportionately.

Any suitable multi-functional controller may be used. One suitable type, however, is shown in FIGURE 2. As shown in FIGURE 1, the D.C. signal from X-ray gage 53 is compared with the signal from the desired gage set point 57 by the summing computer 55. The difference, representing the deviation from the desired gage is applied to the multi-functional controller 59 across line 71 and common 73 as shown in FIGURE 2.

The voltage on line 71 is applied across capacitor 75 to contact A of synchronous converter 77 until capacitor 75 becomes charged and the voltage decays to the value on line 70. Any difference in voltage between contacts A and B of synchronous converter 77 appears as an A.C. signal across capacitor 79 and on the grid of an electronic tube 81 which controls the current to an amplifier 83 and a magnetic coupling 85 energized by an alternating power source B—B. Coupling 85 couples to a combined demodulator and D.C. source 87 which in response to a signal transferred across coupler 85 puts out a signal to a coupler 64 connected to amplifier 63 and algebraic computer 49 of FIGURE 1.

A feedback voltage to contact B of synchronous converter 77 is fed from the demodulator through variable potentiometer 91 across capacitor 93. This voltage leaks away across variable resistor 95 over a time period dependent upon the setting of variable resistor 95. When the X-ray signal is equal to the gage set point signal, and the output current through the external load and feedback resistance is constant, the input voltage X across contact A and common 73 and the feedback voltage Y across contact B and common 73 are both equal to zero. When the X-ray voltage deviates from the desired gage voltage an error voltage is produced across X at the synchronous converter contact A. This voltage is compared with the voltage difference across Y by synchronous converter 77 and amplifier to produce a change in load current through coupler amplifier 63 proportional to the deviation and inversely proportional to the setting of potentiometer 91. The change in amplifier 63 is applied as a signal to algebraic computer 49 and the screw control in FIGURE 1 to change the positon of the screw control. This changes the gage of the strip, which change will ultimately be reflected in a change in voltage across X of the three-functional controller 59. The voltage across Y will now follow the voltage across X as it becomes smaller until the X-ray signal reaches the set point signal again. This proportional control is adjusted by the proportional band potentiometer 91 which may be varied to increase or decrease the response.

Continuous reset action is provided by capacitor 93 and variable resistor 95. A feedback voltage across Y will cause a current through variable resistor 95, depending upon its setting, until the voltage Y reaches zero. At this time the voltage across X must also reach zero or further "reset" action will occur. If there is still a voltage difference across X the output of the controller will change until a zero difference is attained. The amount of the "reset" action is controlled by the adjustment of variable resistor 95 so that a number of repeats at a given "proportional" response during any period of time may be increased or decreased. If the repeats are increased the response of the controller to any gage deviation is increased.

A continuous rate action modifies the output of the controller 59 in accordance with the rate of change in the gage of the strip detected by the X-ray gage. Rate action aids or opposes proportional action according to the direction and rate of change of the gage deviation. The rate voltage varies directly with the input voltage. It charges capacitor 75 at a rate dependent upon the rate setting to produce a voltage across variable resistor 89 which adds algebraically to the input voltage. Consequently the total error voltage at contact A of converter 77 is proportional to the rate of deviation and the amount of deviation of the actual X-ray signal from the desired gage signal. The contribution of the "rate" response to the control response continues so long as there is a change in deviation of the X-ray signal indicating a change in gage and disappears soon after the deviation becomes constant, indicating that the gage deviation is constant, even though the gage is not correct.

The gage control system in FIGURE 1 is designed so that if the X-ray gage is out of service a signal from load cell 10B of stand 10 may be substituted for it and applied through switch 67 to algebraic computer 49 in place of the signal for the X-ray control signal as disclosed in the present inventor's application Ser. No. 569,745 filed July 28, 1966. In the arrangement of the present invention, however, when this is done stand 9 is controlled by a load cell signal from a succeeding stand plus a load cell and screw position signal from a preceding stand rather than from the controlled stand itself. There is consequently no chance of the screws running away on stand 9. The load cell signal from load cell 10B may also in some instances be applied to algebraic computer 49 to be summed with both the feed forward signal and the X-ray signal, particularly if the load cell signal is directed through an integrating computer 68 shown here in dotted outine designed to be reset every time a signal is received from load cell 10B as described in the 569,745 application. In this instance the load cell signal will compensate for the progressive cooling of each strip.

It is also possible to operate stand 9 from a signal from the load cell of stand 10 which has been passed through a multi-functional controller such as 59 in the same manner as shown and described above for the X-ray signal so that both feedback signals are adjusted for rate and direction of deviation as well as actual deviation of the signal from the desired signal. Alternately only the signal from the stand 10 load cell may be corrected by a multi-functional controller. This makes a system which is easier to adjust initially.

The X-ray signal from dead band adjustment 61 is applied to update controller 69 as well as the screw control of stand 10, so that every time a signal is received from load cell 9B indicating that strip has dropped out of stand 9, an average or integrated reset signal representative of changes made on the mill during the rolling of the previous strip is applied to the screw control of stand 9 to reset it to the average or the summed position assumed by stand 10 within the band of adjustment 61 during the rolling of the previous strip. This reset signal may be applied to algebraic computer 49 as shown or may be applied directly to the screw control 17 of stand 9 as shown by a dotted line in FIGURE 1. At the end of each strip stand 10 remains at its last position. These two positions provide a very desirable update of the mill during the rolling of a single order which will compensate for mill setup errors.

It will be seen that as the end of a strip progressively leaves each mill stand, stand 5 is reset to an updated roll position conforming to an initial portion of the first strip of an order entering the mill, and stands 6, 7 and 8 are reset to the strip thickness at the beginning of each strip. Stand 9 resets to an updated position dependent upon the movements of stand 10 during the rolling of the previous strip and stand 10 remains at its last position. The initial four stands thus level the strip and the last two stands are in position to make gage on the next strip in the shortest possible time. Alternately it may be desirable in some instances to apply the update signal from update controller 69 to proportionately preset the screwdown position on stands preceding stands 9, such as stands 8 or 7.

There may be more than one main control stand in the mill. Thus, several, preferably adjacent, stands may be arranged to have quick response screwdown mechanisms and may be controlled in the same manner as described for stand 9 either by separate control devices or with one or more stands in slave relation with the others.

I claim:

1. A control system for a rolling mill including a first rolling stand preceding a second rolling stand preceding an X-ray gage wherein said first stand has a slow acting and said second stand a fast acting screwdown mechanism comprising:
    (a) load cell means to provide a first signal proportional to the separating force between the rolls of the first rolling stand,
    (b) means to provide a second signal nominally proportional to the separation between the rolls of the first stand,
    (c) reference signal means to indicate the desired separation between the rolls of the first rolling stand by a third signal,
    (d) means to convert said first signal into a fourth signal proportional to the increased separation between the rolls of the first rolling stand due to the yield of the mill under said separating force,
    (e) at least one means to combine said second signal with said fourth signal and balance against said third signal to provide a fifth signal proportional to the error between said desired roll position and said actual roll position,
    (f) means to provide a sixth signal proportional to the nominal separation between the rolls of said second stand,
    (g) first means responsive to said fifth signal to operate the screwdown of said first stand,
    (h) second means responsive to said fifth signal to balance it against said sixth signal and a strip gage signal from said X-ray gage and operate the screwdown of said second stand until the three signals are balanced to zero, and
    (i) time delay means to delay the portion of said fifth signal applied to said second means for a time equal to the strip travel time between the first and second stands.

2. A control system according to claim 1 additionally comprising:
    (j) a multi-function controller for receiving said X-ray gage signal, comparing it with a signal indicating the desired strip gage and directing a signal proportional to the deviation of said gage signal from said desired gage, and the rapidity and direction of change of said signal, to said second means.

3. A control system according to claim 2 additionally including a looper control system for the control of the roll speed of said first stand according to the tension of the strip between said first and second stand additionally comprising a feedback of a portion of said sixth signal to the looper control system to directly control said speed according to the movement of said fast acting screwdown of the second stand.

4. A control system according to claim 3 additionally comprising pulsing the portion of the fifth signal which is applied to said first means to operate the slow action screwdown mechanism of the first stand.

5. A control system according to claim 4 wherein there are additional roll stands preceding said first roll stand respectively having their screwdown positions controlled in the same manner as said first stand.

6. A control system according to claim 5 wherein there is at least one additional roll stand succeeding said second stand having its screwdown controlled by a pulsed gage signal from said X-ray gage.

7. A control system according to claim 6 wherein a signal from a load cell associated with one of said succeeding stands is applied to said second means and summed with said main signal from said multi-function controller and said fifth signal to operate said fast operating screwdown on said second stand.

8. A control system for a rolling mill including a first rolling stand, a second rolling stand, and a third rolling stand comprising:
    (a) load cell means to provide a first signal proportional to the separating force between the rolls of the first rolling stand,
    (b) means to provide a second signal proportional to the nominal separation between the rolls of the first stand,
    (c) load cell means to provide a third signal proportional to the separating force between the rolls of the third stand,
    (d) means to provide a fourth signal proportional to the nominal separation between the rolls of the second stand,
    (e) computer means to derive a fifth signal proportional to the actual separation between the rolls of of the first stand from said first and second signals,
    (f) computer means to compare said fifth signal with a reference signal proportional to the desired gage of metal entering said second stand and provide a sixth signal proportional to the error between said signals, and
    (g) computer means to provide the algebraic sum of said third, fourth, and sixth signals to provide a control signal to a screwdown control on said second stand to control the screwdown position thereof.

9. The control system of claim 8 additionally comprising a multi-functional control to bias said third signal proportionally to its deviation from an initially determined reference and the rate and direction of any change in said deviation.

10. An automatic update arrangement for an automatic gage control on a rolling mill consisting of an initial series of gagemeter type screwdown controlled stands and a following series of stands the screwdowns of which are at least partially controlled by signals from a final X-ray gage comprising:
- (a) means associated with each stand to detect when the end of a strip leaves that stand,
- (b) means on each initial mill stand to measure the initial gage of a strip entering the stand,
- (c) memory means on the first stand in the initial series of stands to store a signal proportional to the initial gage on the first strip of an order,
- (d) means to reset the roll position of the first roll stand to the gage of an initial portion of the first strip of an order,
- (e) means to set the roll position of at least the succeeding gagemeter stand to the gage of an initial portion of each succeeding strip of an order, and
- (f) means to integrate and store the X-ray gage change signals of the last stand of the mill and reset at least the preceding X-ray controlled stands to this integrated signal.

11. A rolling mill having the screwdown of at least one roll stand operated by an automatic gage control system comprising:
- (a) a screw control device for said screwdown,
- (b) an X-ray gage succeeding said stand in said mill,
- (c) a feedback circuit from said X-ray gage to said screw control for the operation thereof, and
- (d) multi-functional controller means to compare said X-ray signal with the desired gage of strip to obtain an error signal and bias said error signal according to the size of any deviation from said desired gage and the change and direction of said deviation.

References Cited

UNITED STATES PATENTS

| | | | |
|---|---|---|---|
| 3,110,203 | 11/1963 | Stringer | 72—234 |
| 3,111,046 | 11/1963 | Koss et al. | 72—8 |
| 3,186,200 | 6/1965 | Maxwell | 72—8 |
| 3,169,421 | 2/1965 | Bloodworth | 72—11 |
| 3,318,125 | 5/1967 | Pullen | 72—11 |
| 3,328,987 | 7/1967 | Feraci | 72—11 |
| 3,355,918 | 12/1967 | Wallace | 72—11 |
| 3,357,217 | 12/1967 | Wallace | 72—11 |

CHARLES W. LANHAM, *Primary Examiner.*

A. RUDERMAN, *Assistant Examiner.*

U.S. Cl. X.R.

72—11, 14, 16, 21, 234